United States Patent
Hosseini et al.

(10) Patent No.: US 12,114,289 B2
(45) Date of Patent: Oct. 8, 2024

(54) COORDINATION SIGNALING FOR SIDELINK RESOURCE SELECTION

(71) Applicant: QUALCOMM Incorporated, San Diego, CA (US)

(72) Inventors: Seyedkianoush Hosseini, San Diego, CA (US); Tingfang Ji, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 17/444,449

(22) Filed: Aug. 4, 2021

(65) Prior Publication Data

US 2022/0046603 A1    Feb. 10, 2022

Related U.S. Application Data

(60) Provisional application No. 62/706,301, filed on Aug. 7, 2020.

(51) Int. Cl.
| | |
|---|---|
| *H04W 72/02* | (2009.01) |
| *H04W 4/40* | (2018.01) |
| *H04W 4/46* | (2018.01) |
| *H04W 72/0446* | (2023.01) |
| *H04W 72/0453* | (2023.01) |
| *H04W 92/18* | (2009.01) |

(52) U.S. Cl.
CPC ............ *H04W 72/02* (2013.01); *H04W 4/40* (2018.02); *H04W 4/46* (2018.02); *H04W 72/0446* (2013.01); *H04W 72/0453* (2013.01); *H04W 92/18* (2013.01)

(58) Field of Classification Search
CPC ............ H04W 72/02; H04W 72/0446; H04W 72/0453; H04W 92/18; H04W 72/20
See application file for complete search history.

(56) References Cited

U.S. PATENT DOCUMENTS

| | | | |
|---|---|---|---|
| 11,601,789 B2* | 3/2023 | Panteleev | ......... H04W 72/1263 |
| 2020/0029340 A1 | 1/2020 | He et al. | |
| 2021/0250954 A1* | 8/2021 | Li | .......................... H04L 1/1854 |
| 2023/0081131 A1* | 3/2023 | Selvanesan | ......... H04W 74/002 370/329 |
| 2023/0087401 A1* | 3/2023 | Shin | ...................... H04L 5/0035 370/329 |

(Continued)

FOREIGN PATENT DOCUMENTS

WO    WO-2018031086 A1    2/2018

OTHER PUBLICATIONS

ETSI, TR 137 985, V17.1.1 (Year: 2022).*

(Continued)

*Primary Examiner* — Jae Y Lee
*Assistant Examiner* — Aixa A Guadalupe Cruz
(74) *Attorney, Agent, or Firm* — Harrity & Harrity, LLP

(57) ABSTRACT

Various aspects of the present disclosure generally relate to wireless communication. In some aspects, a first user equipment (UE) may select a sidelink resource for inter-UE coordination signaling with a second UE. The UE may transmit, using the sidelink resource, an inter-UE coordination signal from the first UE to the second UE via a sidelink interface. Numerous other aspects are provided.

30 Claims, 8 Drawing Sheets

(56) References Cited

U.S. PATENT DOCUMENTS

2023/0171738 A1* 6/2023 Di Girolamo ........ H04W 72/20
                                                    370/329
2023/0180342 A1* 6/2023 Shin ....................... H04W 4/70
                                                    370/329

OTHER PUBLICATIONS

Huawei., et al., "On Sidelink Enhancement", 3GPP Draft, R1-2004602, 3GPP TSG RAN WG1 Meeting #101-e, 3rd Generation Partnership Project (3GPP), Mobile Competence Centre, 650, Route Des Lucioles, F-06921 Sophia-Antipolis Cedex, France, vol. RAN WG1. No. E-meeting, May 25, 2020-Jun. 5, 2020, May 16, 2020 (May 16, 2020), XP051886317, 3 Pages, Retrieved from the Internet: URL:https://ftp.3gpp.org/tsg_ran/WG1_RL1/TSGR1_101-e/Docs/R1-2004602.zip, R1-2004602.docx [retrieved on May 16, 2020], The whole document, Paragraph 1 Introduction, p. 1, Paragraph 3.2 Resource Allocation to Enhance Reliability and Reduce Latency, p. 2,-p. 3.
Intel Corporation: "Feature Lead Summary for NR-V2X AI—7.2.4.1.4 Resource Allocation Mechanism", 3GPP Draft, 3GPP TSG RAN WG1 Meeting #96, R1-1903623—Intel—NR V2X AI 7.2.4.1.4—Offline 2, 3rd Generation Partnership Project (3GPP), Mobile Competence Centre, 650, Route Des Lucioles, F-06921 Sophia-Antipolis Cedex, France, vol. RAN WG1. No. Athens, Greece, Feb. 25, 2019-Mar. 1, 2019, Mar. 3, 2019 (Mar. 3, 2019), XP051690885, pp. 1-18, Retrieved from the Internet: URL: http://www.3gpp.org/ftp/tsg%5Fran/WG1%5FRL1/TSGR1%5F96/Docs/R1%2D1903623%2Ezip [retrieved on Mar. 3, 2019] Sidelink Resource Allocation Mode-2 and Its Sub-Modes, p. 1-p. 18.
International Search Report and Written Opinion—PCT/US2021/071117—ISA/EPO—Dec. 2, 2021.

* cited by examiner

COORDINATION SIGNALING FOR SIDELINK RESOURCE SELECTION

CROSS-REFERENCE TO RELATED APPLICATION

This patent application claims priority to U.S. Provisional Patent Application No. 62/706,301, filed on Aug. 7, 2020, entitled "COORDINATION SIGNALING FOR SIDELINK RESOURCE SELECTION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for coordination signaling for sidelink resource selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes: selecting a sidelink resource for inter-UE coordination signaling with a second UE; and transmitting, using the sidelink resource, an inter-UE coordination signal from the first UE to the second UE via a sidelink interface.

In some aspects, a first UE for wireless communication includes a memory and one or more processors coupled to the memory, the one or more processors configured to: select a sidelink resource for inter-UE coordination signaling with a second UE; and transmit, using the sidelink resource, an inter-UE coordination signal from the first UE to the second UE via a sidelink interface.

In some aspects, a non-transitory computer-readable medium storing a set of instructions for wireless communication includes one or more instructions that, when executed by one or more processors of a first UE, cause the first UE to: select a sidelink resource for inter-UE coordination signaling with a second UE; and transmit, using the sidelink resource, an inter-UE coordination signal from the first UE to the second UE via a sidelink interface.

In some aspects, a first apparatus for wireless communication includes: means for selecting a sidelink resource for coordination signaling with a second apparatus; and means for transmitting, using the sidelink resource, a coordination signal from the first apparatus to the second apparatus via a sidelink interface.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
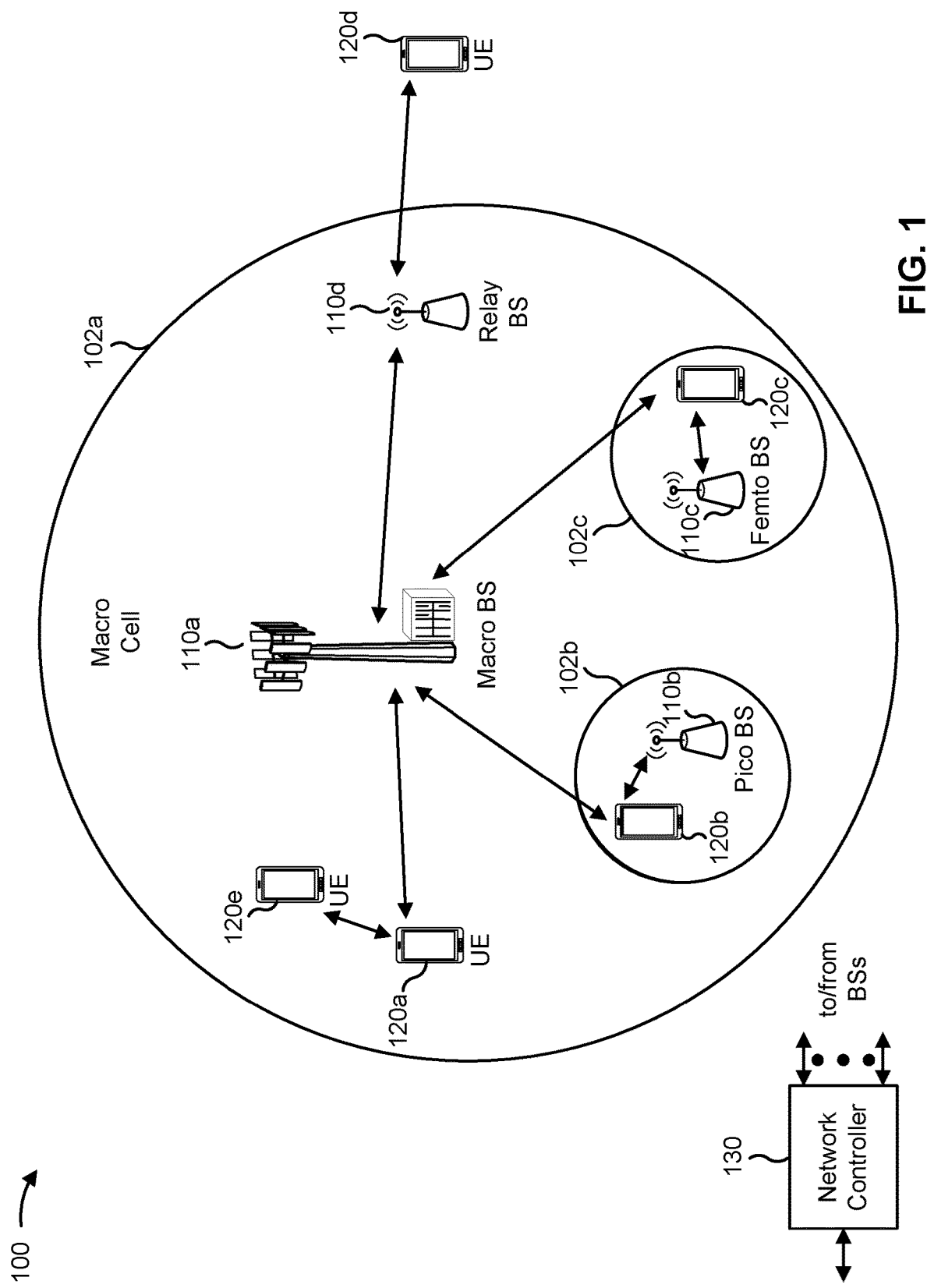
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
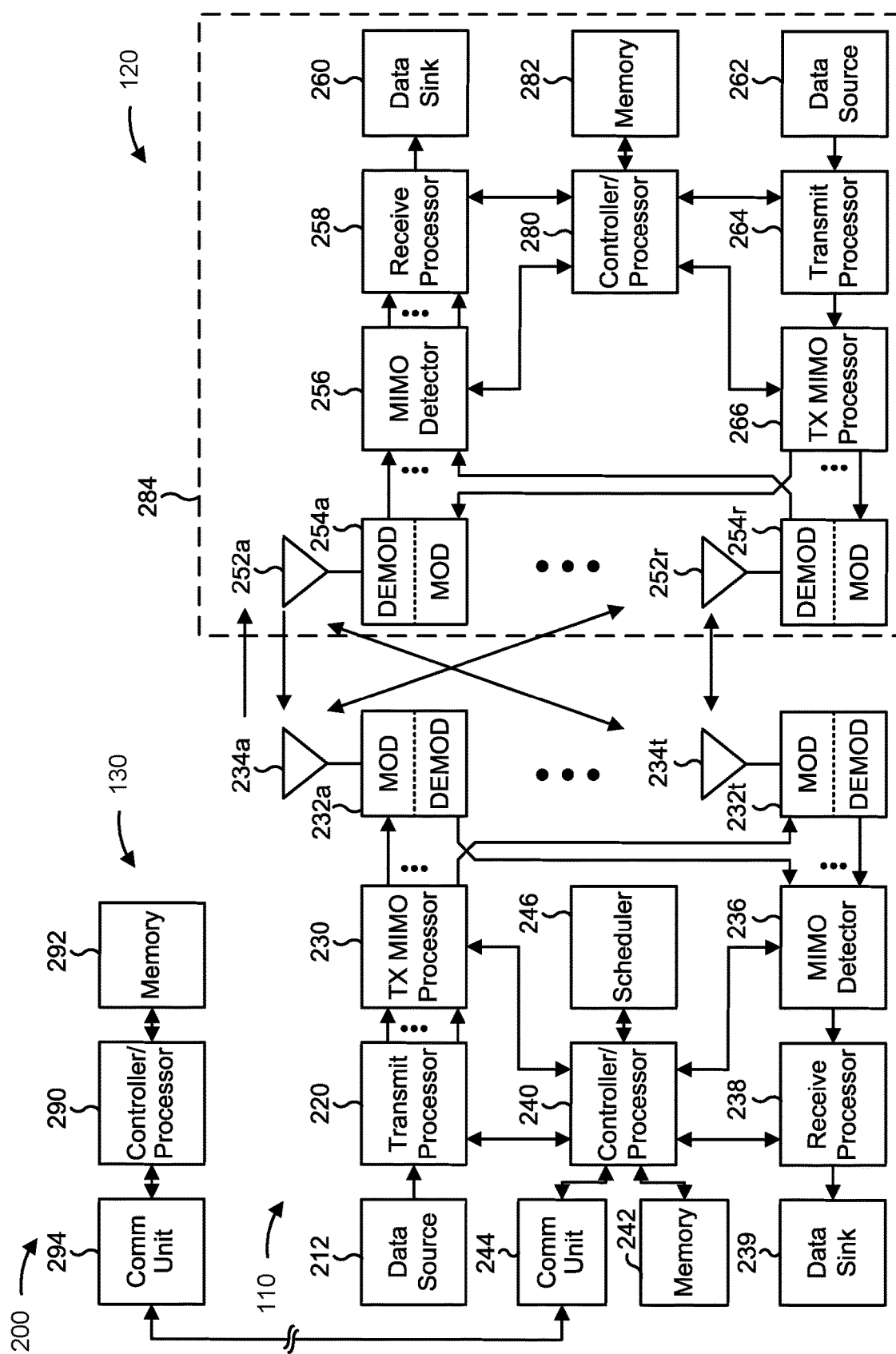
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-8.

Controller/processor 240 of base station 110, controller/processor 280 of UE 120, and/or any other component(s) of FIG. 2 may perform one or more techniques associated with coordination signaling for sidelink resource selection, as described in more detail elsewhere herein. For example, controller/processor 240 of base station 110, controller/processor 280 of UE 120, and/or any other component(s) of FIG. 2 may perform or direct operations of, for example, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some aspects, executing instructions may include running the instructions, converting the instructions, compiling the instructions, and/or interpreting the instructions, among other examples.

In some aspects, a UE (e.g., UE 120) may include means for selecting a sidelink resource for inter-UE coordination signaling with a second UE, means for transmitting, using the sidelink resource, an inter-UE coordination signal from the first UE to the second UE via a sidelink interface, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
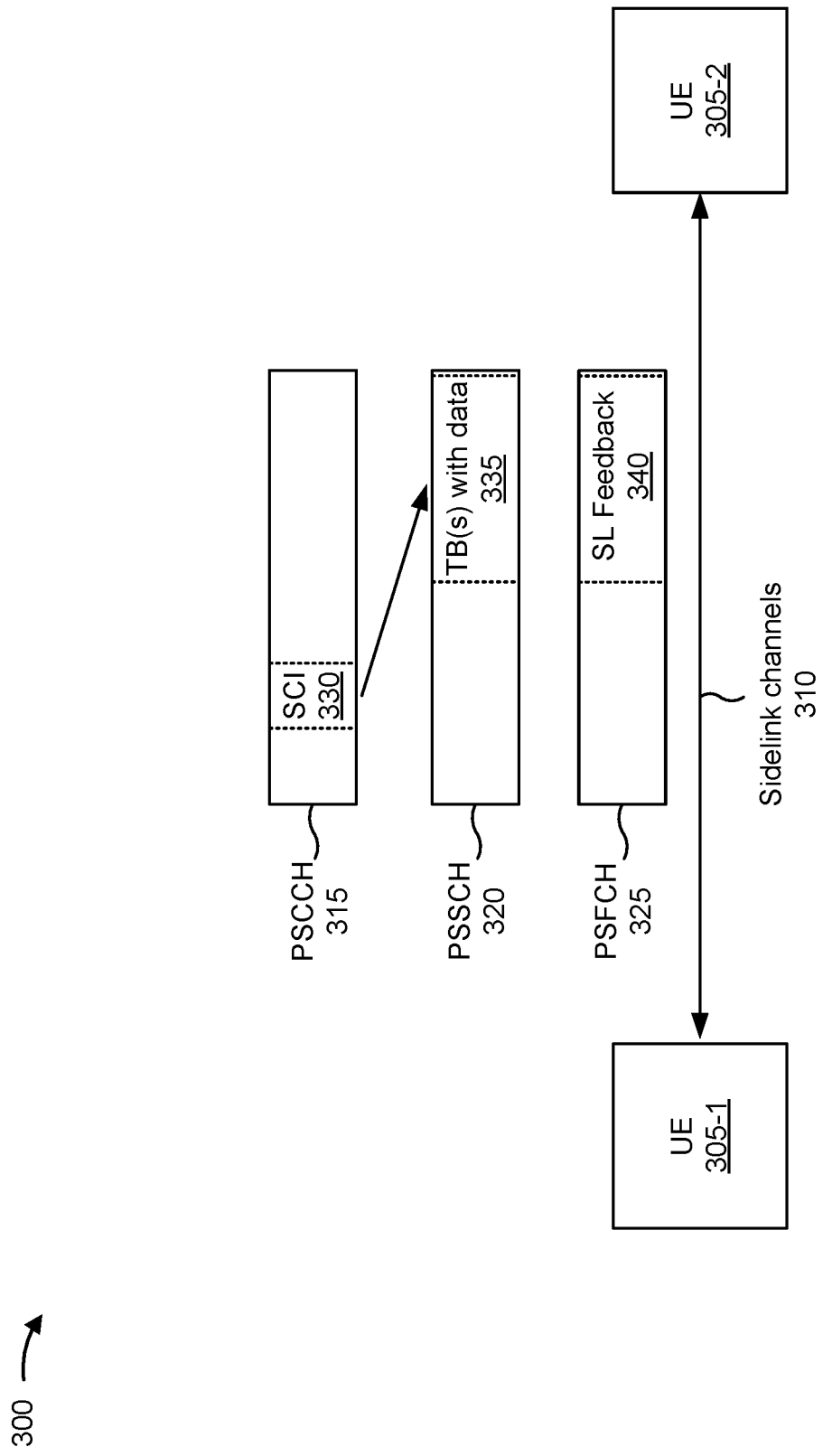
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-person (V2P) communications, and/or the like), mesh networking, and/or the like. In some aspects, the UEs 305 (e.g., UE 305-1 and/or UE 305-2) may be similar to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
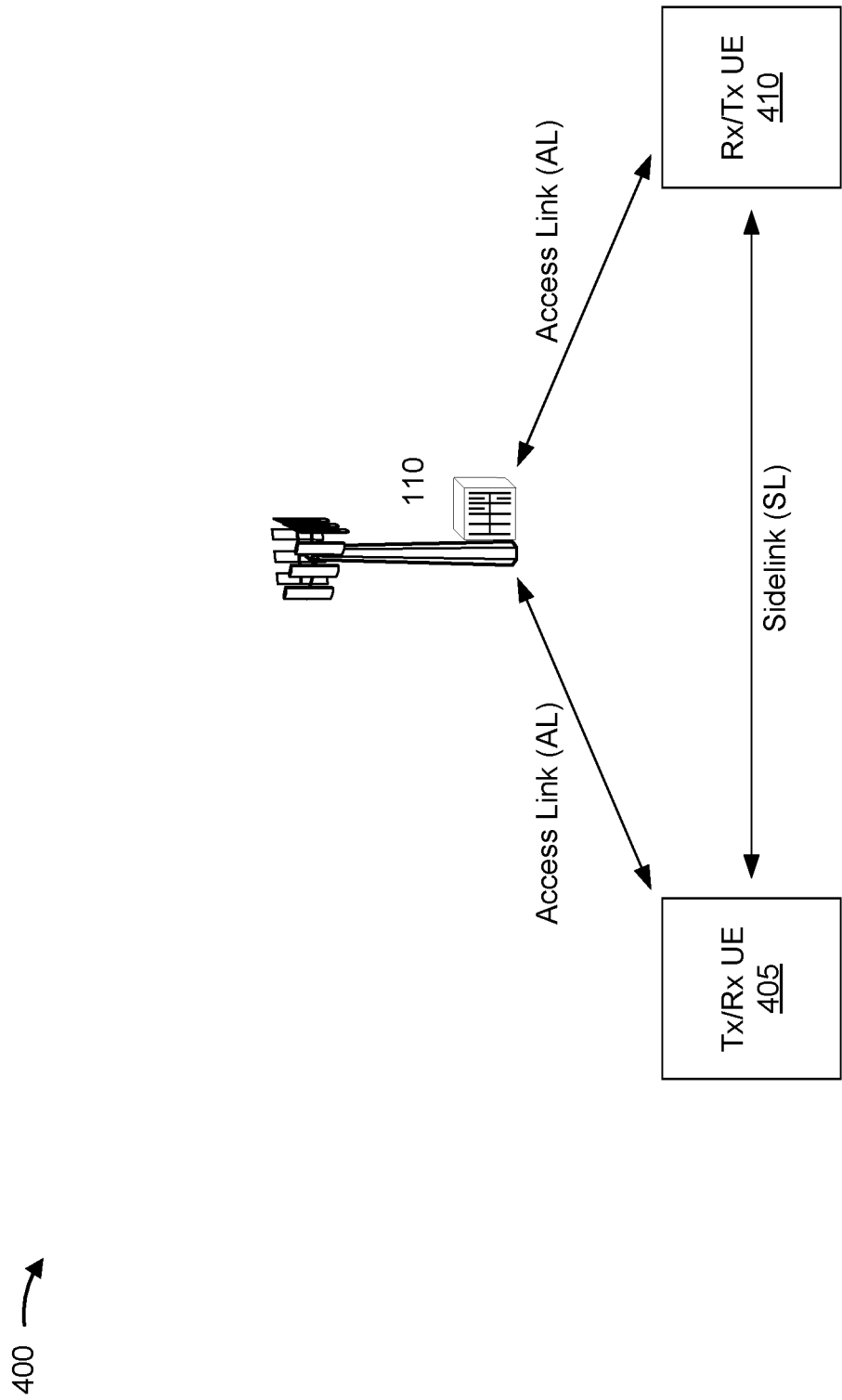
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may be similar to one or more UEs described elsewhere herein, such as the UE 120 of FIG.

1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
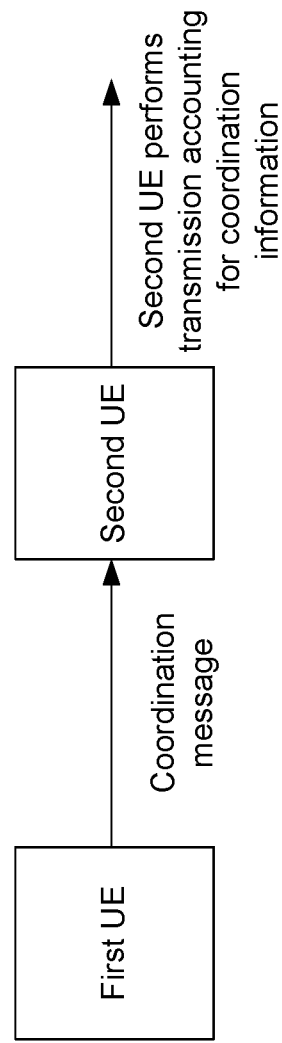
FIG. 5 is a diagram illustrating an example of coordination signaling, in accordance with the present disclosure.

FIG. 5 is a diagram illustrating an example 500 of coordination signaling, in accordance with the present disclosure.

In example 500, a first UE (e.g., UE 120a) exchanges inter-UE coordination signaling with a second UE (e.g., UE 120e). The first UE and the second UE may operate in an in-coverage mode (where both of the first UE and the second UE are within radio access network coverage), a partial coverage mode (where only one of the first UE and the second UE is within radio access network coverage), an out-of-coverage mode (where neither of the first UE and the second UE is within radio access network coverage), and/or the like. In some aspects, the first UE may determine a set of sidelink resources available for a resource allocation. The first UE may determine the set of sidelink resources based at least in part on determining that the set of sidelink resources are to be selected, or based at least in part on a request, referred to herein as an inter-UE coordination request, received from the second UE or a base station. In some aspects, the first UE may determine the set of sidelink resources based at least in part on a sensing operation, which may be performed before receiving an inter-UE coordination request or after receiving the inter-UE coordination request. The first UE may transmit information indicating the set of available resources to the second UE via inter-UE coordination signaling (shown as a coordination message and referred to in some aspects as an inter-UE coordination message). The first UE may transmit the set of available resources using an NR sidelink resource allocation mode 2. In the NR sidelink resource allocation mode 2, resource allocation is handled by UEs (e.g., in comparison to an NR sidelink resource allocation mode 1, in which resource allocation is handled by a scheduling entity such as a base station). The second UE may select a sidelink resource for a transmission from the second UE based at least in part on the set of available resources received from the first UE. As shown, the second UE may perform the transmission accounting for the coordination information (e.g., via a sidelink resource indicated by the inter-UE coordination message, and/or the like). Inter-UE coordination signaling can also be used to indicate resources that are not preferred for a transmission by the second UE. Inter-UE coordination signaling related to resource allocation may reduce collisions between the first UE and the second UE. Inter-UE coordination signaling related to resource allocation may reduce a power consumption for the first UE and/or the second UE.

As indicated above, FIG. 5 is provided as an example. Other examples may differ from what is described with respect to FIG. 5.

A first UE may transmit a request for inter-UE coordination to a second UE. For example, the first UE may request an inter-UE coordination report from the second UE. The inter-UE coordination report may include a set of sidelink resources available (e.g., preferred) for a resource allocation, a set of sidelink resources not preferred for a resource allocation, or the like. The set of sidelink resources available for the resource allocation may be from the perspective of the second UE. The second UE may receive the request from the first UE. The second UE may transmit the inter-UE coordination report to the first UE based at least in part on the request for inter-UE coordination received from the first UE. In some aspects, the first UE may select resources for the transmission to be used by the second UE, and then may schedule the second UE by transmission of the inter-UE coordination message. In some other aspects, the second UE may take into account the inter-UE coordination message when selecting resources (e.g., the inter-UE coordination message may be non-binding on the second UE).

However, the first UE and the second UE may be unaware of which sidelink resources to use when transmitting the request for inter-UE coordination and transmitting the inter-UE coordination report, respectively. In other words, the first UE and the second UE may not be configured for selecting sidelink resources for inter-UE coordination signaling. Without a defined sidelink resource selection scheme for inter-UE coordination signaling, the first UE and the second UE may transmit the request for inter-UE coordination and/or the inter-UE coordination report on sidelink resources that are already reserved for other sidelink transmissions, leading to collisions between sidelink transmissions and inter-UE coordination messaging. Such collisions decrease throughput, increase interference, and decrease efficiency of sidelink communications.

In various aspects of techniques and apparatuses described herein, sidelink resources may be defined for inter-UE coordination signaling. A first UE may select a sidelink resource for transmitting a request for inter-UE coordination. A second UE may select a sidelink resource for transmitting an inter-UE coordination report. In some aspects, the sidelink resources for transmitting the request for inter-UE coordination and/or the inter-UE coordination report may be selected based at least in part on a sensing and reservation resource allocation scheme (e.g., Mode 2 resource allocation). In some aspects, the sidelink resources for transmitting the request for inter-UE coordination and/or the inter-UE coordination report may be selected based at least in part on a configuration received from another node, such as a base station or a relay node (e.g., Mode 1 resource allocation). In some aspects, the sidelink resources for transmitting the request for inter-UE coordination and/or the inter-UE coordination report may be selected from a pool of dedicated resources for inter-UE coordination signaling. By defining sidelink resources for inter-UE coordination signaling, the first UE and the second UE may increase throughput, decrease interference, and increase efficiency of sidelink communications.

Figure 6:
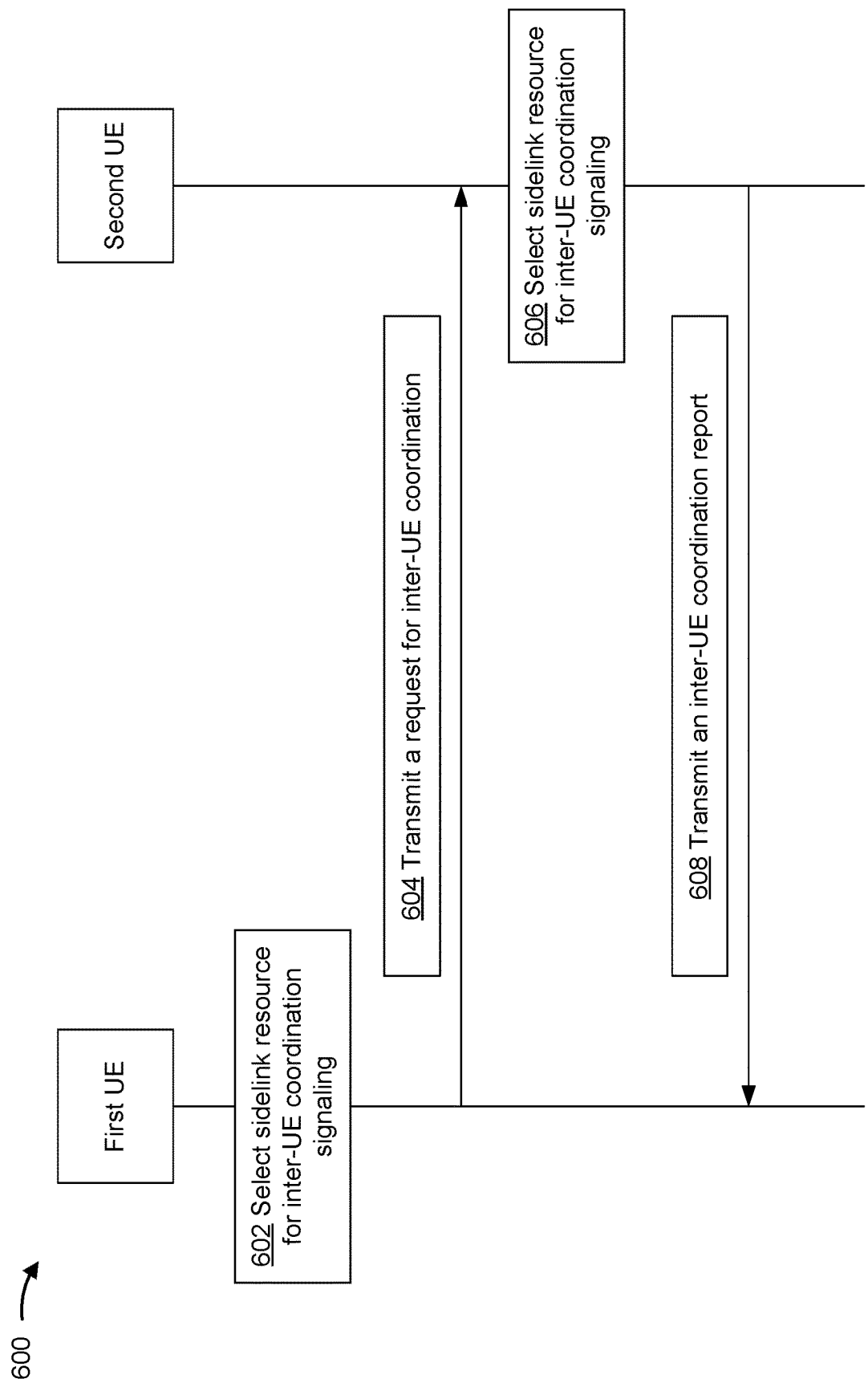
FIGS. 6-7 are diagrams illustrating examples associated with coordination signaling for sidelink resource selection, in accordance with the present disclosure.

FIG. 6 is a diagram illustrating an example 600 of coordination signaling for sidelink resource selection, in accordance with the present disclosure. As shown in FIG. 6, example 600 includes communication between a first UE (e.g., UE 120a) and a second UE (e.g., UE 120e). In some aspects, the first UE and the second UE may be included in a wireless network such as wireless network 100. The first UE and the second UE may communicate on a wireless sidelink.

As shown by reference number 602, the first UE may select a sidelink resource for inter-UE coordination signaling. For example, the first UE may select the sidelink resource for a request for inter-UE coordination to be transmitted to the second UE.

In some aspects, the first UE may select the sidelink resource for transmitting the request for inter-UE coordination based at least in part on a sidelink resource allocation (e.g., a Mode 2 resource allocation). The sidelink resource may be selected from a plurality of sidelink resources (e.g., resources that are available for sidelink may be potentially available for transmitting the request for inter-UE coordination). In some aspects, the first UE may sense a sidelink resource that is available and reserve the sidelink resource for transmitting the request for inter-UE coordination. The selection of the sidelink resource based at least in part on sensing and reservation may incur additional latency, which may increase a likelihood that an inter-UE coordination report received based at least in part on the request may be stale (e.g., may be too old to be useful to the second UE). In some aspects, the sensing and reservation may be performed by the first UE across sidelink resources dedicated for transmitting requests for inter-UE coordination, which may reduce a likelihood of a collision between a PSSCH and the request for inter-UE coordination.

In some aspects, the first UE may select the sidelink resource for transmitting the request for inter-UE coordination based at least in part on a sidelink resource configuration that defines a set of sidelink resources. For example, the set of sidelink resources may be configured for inter-UE coordination signaling. The first UE may receive the sidelink resource configuration from a base station or another node, such as a relay node or another UE. The first UE may select the sidelink resource for transmitting the request for inter-UE coordination from the set of sidelink resources defined by the sidelink resource configuration. In other words, the set of sidelink resources included in the sidelink resource configuration may be defined by the base station and/or the relay node, and the first UE may select the sidelink resource from the set of sidelink resources included in the sidelink resource configuration.

In some aspects, the first UE may select the sidelink resource for transmitting the request for inter-UE coordination from dedicated resources in a sidelink resource pool. The dedicated resources in the sidelink resource pool may be resources that are set aside for inter-UE coordination signaling. The dedicated resources may be preconfigured per sidelink resource pool, and/or the dedicated resources may be preconfigured per carrier. In some aspects, the dedicated resources may be preconfigured per bandwidth part. In some aspects, the dedicated resources may be configured (such as via RRC signaling) per sidelink resource pool, per carrier, and/or per bandwidth part.

In some aspects, the first UE may select the sidelink resource for transmitting the request for inter-UE coordination from a sidelink resource pool that is dedicated for inter-UE coordination signaling. In other words, in this case, the sidelink resource pool may be a dedicated resource pool for inter-UE coordination signaling (e.g., transmitting requests for inter-UE coordination), as opposed to the sidelink resource being selected from dedicated resources in a common sidelink resource pool that may be used for purposes other than inter-UE signaling.

In some aspects, the sidelink resource selected for transmitting the request for inter-UE coordination may be associated with one or more sub-channels (e.g., may occupy one or more sub-channels, may be configured to occupy one or more sub-channels). In some aspects, the sidelink resource may be associated with one or more resource blocks (e.g., may occupy one or more resource blocks, may be configured to occupy one or more resource blocks). The sidelink resource may be included in a plurality of sidelink resources that are configured with a defined periodicity. The plurality of sidelink resources may be configured in a single sidelink slot (such as in different frequency resources in the single sidelink slot), or the plurality of sidelink resources may be distributed across a plurality of sidelink slots.

In some aspects, the plurality of sidelink resources available for transmitting the request for inter-UE coordination may be configured in a frequency domain and in a time domain to reduce latency. For example, the plurality of sidelink resources may be relatively sparse in frequency and relatively dense in time, to reduce latency in transmitting the request for inter-UE coordination. An illustration of a plurality of sidelink resources that are relatively sparse in frequency and relatively dense in time is provided in the lower half of FIG. 7. It can be seen that the sidelink resources occur in multiple slots in a row, but only occur in every fifth frequency resource in a given slot. In some aspects, the first UE may transmit signaling to a plurality of sidelink UEs indicating that the plurality of sidelink resources available for transmitting the request for inter-UE coordination are not available for data transmissions. As a result, the plurality of sidelink UEs may not use the plurality of sidelink resources for performing data transmissions.

In some aspects, mechanisms described herein for selecting the sidelink resource for transmitting the request for inter-UE coordination may be used in sidelink bands in which V2X may be deployed. The mechanisms described herein may be used in other bands, such as the Intelligent Transportation Systems (ITS) band. The ITS band may be used for data exchange between high-speed vehicles and between the vehicles and a roadside infrastructure. The ITS band may be a licensed band of 5.9 GHz (e.g., 5.85-5.925 GHz).

As shown by reference number 604, the first UE may use the sidelink resource to transmit the request for inter-UE coordination to the second UE. In other words, the first UE may transmit the request for inter-UE coordination on the sidelink resource selected at least in part on the sensing and reservation performed at the first UE, the sidelink resource configuration received at the first UE, the dedicated resources in the sidelink resource pool, the dedicated resource pool, and/or the like. The first UE may transmit the request for inter-UE coordination over a sidelink interface to the second UE.

As shown by reference number 606, the second UE may receive the request for inter-UE coordination from the first UE. The second UE may select a sidelink resource for inter-UE coordination signaling. For example, the second UE may select the sidelink resource for an inter-UE coordination report to be transmitted to the first UE.

In some aspects, the second UE may select the sidelink resource for transmitting the inter-UE coordination report based at least in part on a sidelink resource allocation. The sidelink resource may be selected from a plurality of sidelink resources (e.g., resources that are available for sidelink communications may be potentially available for transmitting the inter-UE coordination report). The second UE may sense a sidelink resource that is available and/or reserve the sidelink resource for transmitting the inter-UE coordination report. The sensing and reservation may be performed by the second UE across sidelink resources dedicated for transmitting inter-UE coordination reports, which may reduce a likelihood of a collision between a PSSCH and the inter-UE coordination report. In some aspects, the second UE may reserve the sidelink resource without sensing the sidelink resource.

In some aspects, the second UE may select the sidelink resource for transmitting the inter-UE coordination report based at least in part on a sidelink resource configuration that defines a set of sidelink resources. The second UE may receive the sidelink resource configuration from a base station or another node, such as a relay node. The second UE may select the sidelink resource for transmitting the inter-UE coordination report from the set of sidelink resources included in the sidelink resource configuration. In other words, the set of sidelink resources included in the sidelink resource configuration may be defined by the base station and/or the relay node, and the second UE may select the sidelink resource from the set of sidelink resources included in the sidelink resource configuration.

In some aspects, the second UE may select the sidelink resource for transmitting the inter-UE coordination report from dedicated resources in a sidelink resource pool. The dedicated resources in the sidelink resource pool may be resources that are set aside for inter-UE coordination signaling. The dedicated resources may be preconfigured per sidelink resource pool, and/or the dedicated resources may be preconfigured per carrier. The dedicated resources may be associated with a time duration that is slot-based (e.g., one or more slots) or partial-slot based (e.g., one or more symbols of a slot). The dedicated resources may be defined over semi-static uplink symbols.

In some aspects, the second UE may select the sidelink resource for transmitting the inter-UE coordination report from resources in a sidelink resource pool that is dedicated for inter-UE coordination signaling. In other words, in this case, the sidelink resource pool may be a dedicated resource pool for inter-UE coordination signaling (e.g., transmitting inter-UE coordination reports), as opposed to the sidelink resource being selected from dedicated resources in a common sidelink resource pool that may be used for purposes other than inter-UE signaling.

In some aspects, the sidelink resource selected for transmitting the inter-UE coordination report may be associated with one or more sub-channels. The sidelink resource may be included in a plurality of sidelink resources that are configured with a defined periodicity. The plurality of sidelink resources may be configured in a single sidelink slot, or the plurality of sidelink resources may be distributed across a plurality of sidelink slots.

In some aspects, the plurality of sidelink resources available for transmitting the inter-UE coordination report may be configured in a frequency domain and in a time domain to reduce latency. For example, the plurality of resources may be relatively sparse in frequency and relatively dense in time, to reduce latency in transmitting the inter-UE coordination report.

In some aspects, the second UE may transmit signaling to a plurality of sidelink UEs indicating that the plurality of sidelink resources available for transmitting the inter-UE coordination report are not available for data transmissions. As a result, the plurality of sidelink UEs may not use the plurality of sidelink resources for performing data transmissions.

In some aspects, mechanisms described herein for selecting the sidelink resource for transmitting the inter-UE coordination report may be used in sidelink bands in which V2X may be deployed. The mechanisms described herein may be used in other bands, such as the ITS band.

In some aspects, the sidelink resource selected by the first UE for transmitting the request for inter-UE coordination may be a first sidelink resource, and the sidelink resource selected by the second UE for transmitting the inter-UE coordination report may be a second sidelink resource.

In some aspects, the second UE may determine the second sidelink resource for transmitting the inter-UE coordination report based at least in part on the first sidelink resource used for transmitting the request for inter-UE coordination. For example, the second UE may map the first sidelink resource to the second sidelink resource. In other words, the second sidelink resource may be mapped to or determined based at least in part on the first sidelink resource. The first sidelink resource and the second sidelink resource may be included in a same defined period. In some cases, the first sidelink resource for transmitting the request for inter-UE coordination may be mapped to two or more sidelink resources to be used for transmitting the inter-UE coordination report.

In some aspects, the second UE may determine the second sidelink resource for transmitting the inter-UE coordination report based at least in part on a sidelink resource association scheme. For example, the second UE may determine the second sidelink resource based at least in part on mapping a starting sub-channel associated with the first sidelink resource to the second sidelink resource. The starting sub-channel used for transmitting the request for inter-UE coordination may be used to determine the second sidelink resource for transmitting the inter-UE coordination report. The second UE may determine additional sidelink resources for inter-UE coordination reporting based at least in part on a fixed offset from the second sidelink resource. For example, the starting sub-channel used for transmitting the request for inter-UE coordination may be mapped to a single sidelink resource for transmitting the inter-UE coordination report, and other sidelink resources for inter-UE coordination reporting may be derived implicitly (e.g., by defining the fixed offset from the second sidelink resource used for transmitting the inter-UE coordination report).

In some aspects, the second UE may map a sub-channel associated with the first sidelink resource used for transmitting the request for inter-UE coordination to a set of sidelink resources available for inter-UE coordination reporting. In other words, the sub-channel used for transmitting the request may be mapped to the set of sidelink resources, and the set of sidelink resources may become available for selection and transmission of the inter-UE coordination report.

In some aspects, the first sidelink resource may be included in a first plurality of sidelink resources and the second sidelink resource may be included in a second plurality of sidelink resources. The second plurality of sidelink resources may be a multiple (e.g., denoted by alpha) of the first plurality of sidelink resources. The multiple may be an integer greater than or equal to one. For example, a single sidelink resource for transmitting the request for inter-UE coordination may be mapped to one or more sidelink resources available for transmitting the inter-UE coordination report. In other words, a number of sidelink resources available for transmitting the inter-UE coordination report may be greater than or equal to a number of sidelink resources available for transmitting the request for inter-UE coordination.

The number of sidelink resources available for transmitting the request for inter-UE coordination and the inter-UE coordination report may be preconfigured separately. Considering a sub-channel as a frequency unit for defining the sidelink resources, sub-channel sizes may be set differently for the sidelink resources for transmitting the request for inter-UE coordination and the sidelink resources for transmitting the inter-UE coordination report, respectively.

In some aspects, the second UE may map the first sidelink resource to the second sidelink resource based at least in part on an index assigned to the first sidelink resource. The index may be assigned to the first sidelink resource, and the index may map to one or more sidelink resources available for transmitting the inter-UE coordination report. For example, a first sidelink resource having a first index may map to second sidelink resources, where the second sidelink resources may be a multiple of the first sidelink resource. As another example, K sidelink resources for transmitting requests for inter-UE coordination may be mapped to each of the first sidelink resources in K consecutive sidelink resources available for inter-UE coordination reporting, where K is a positive integer.

In some aspects, the second UE may map the first sidelink resource to a plurality of sidelink resources, wherein at least a portion of the plurality of sidelink resources may be available for transmitting the inter-UE coordination report. For example, the second UE may map a single sidelink resource used for transmitting the request for inter-UE coordination to multiple sidelink resources. The multiple sidelink resources may be used for transmitting the inter-UE coordination report based at least in part on rate-matching. For example, the message carrying the inter-UE coordination information may be mapped to all available resources. The multiple sidelink resources may be used for transmitting the inter-UE coordination report, but a same transport block may be repeated in each of the multiple sidelink resources. As an example, multiple UEs may respond to a request from a given UE, and accommodating multiple sidelink resources for inter-UE coordination reporting may reduce a likelihood of collisions. Alternatively, a single sidelink resource in the multiple sidelink resources may be used for transmitting the inter-UE coordination report.

As shown by reference number 608, the second UE may use the sidelink resource to transmit the inter-UE coordination report to the first UE. In other words, the second UE may transmit the inter-UE coordination report on the sidelink resource selected at least in part on the sensing and reservation performed at the second UE, the sidelink resource configuration received at the second UE, the dedicated resources in the sidelink resource pool, the dedicated resource pool, the mapping between sidelink resources used for transmitting the request for inter-UE coordination and the inter-UE coordination report, and/or the like. The second UE may transmit the inter-UE coordination report over the sidelink interface to the first UE.

In some aspects, the inter-UE coordination report transmitted by the second UE may include a set of sidelink resources available for a resource allocation. The first UE may receive the inter-UE coordination report, and the first UE may select a sidelink resource for a sidelink transmission based at least in part on the inter-UE coordination report received from the second UE.

As indicated above, FIG. 6 is provided as an example. Other examples may differ from what is described with respect to FIG. 6.

Figure 7:
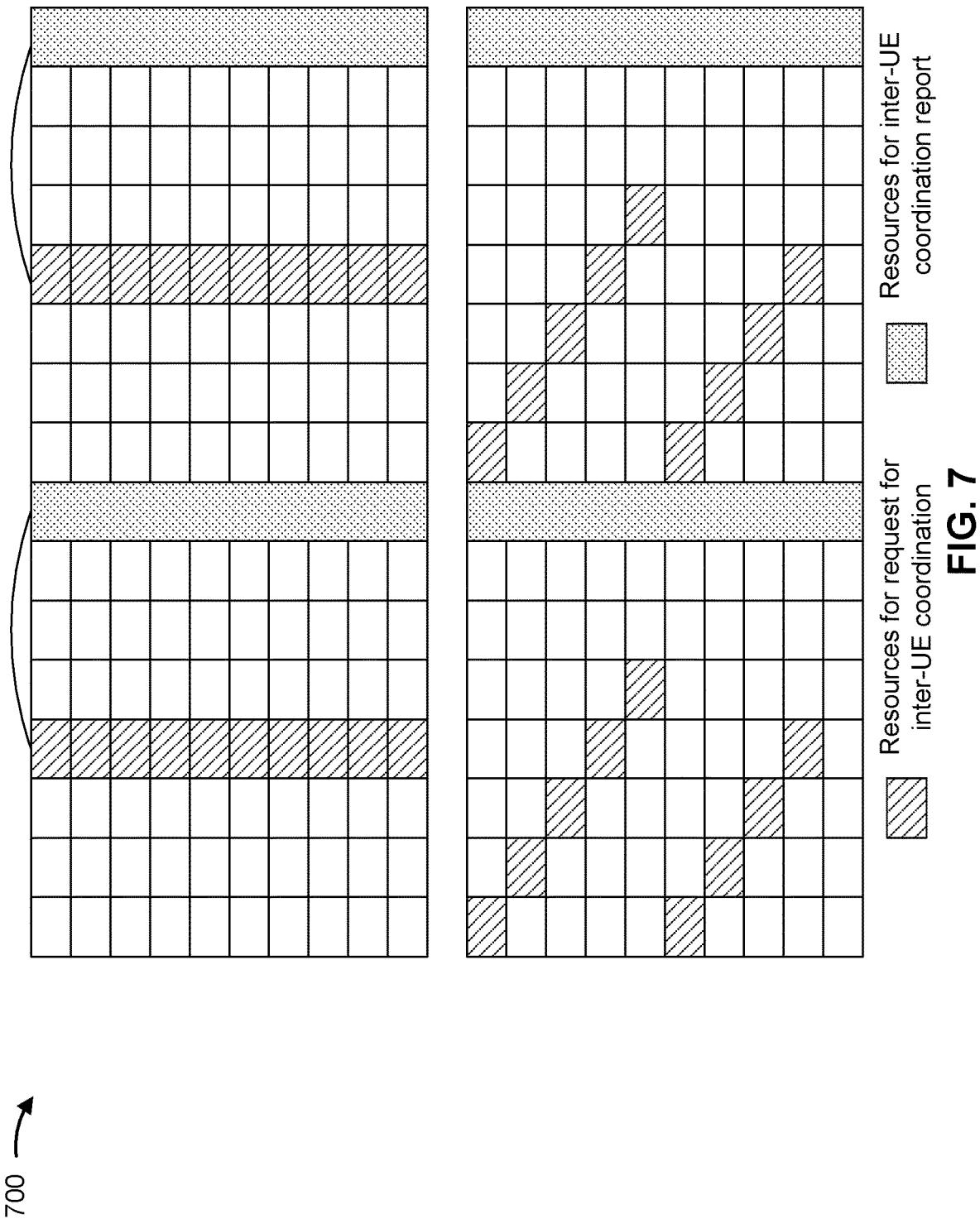

FIG. 7 is a diagram illustrating an example 700 of coordination signaling for sidelink resource selection, in accordance with the present disclosure.

As shown in FIG. 7, sidelink resources may be configured for transmitting requests for inter-UE coordination and transmitting inter-UE coordination reports. The sidelink resources may be configured with a certain periodicity. The sidelink resources may be configured in one sidelink slot (top figure), or the sidelink resources may be distributed over multiple sidelink slots (bottom figure). A given sidelink resource may occupy a single sub-channel or multiple sub-channels. The sidelink resources may be configured in a frequency domain and in a time domain to reduce latency when transmitting the request for inter-UE coordination. For example, the plurality of sidelink resources may be relatively sparse in frequency and relatively dense in time to reduce latency when transmitting the request for inter-UE coordination, as illustrated in the bottom part of FIG. 7.

In some aspects, a sidelink resource for transmitting a request for inter-UE coordination may be mapped to one or more sidelink resources available for inter-UE coordination reporting using a sidelink resource association. A starting sub-channel used for sending the request for inter-UE coordination may be used to determine the one or more sidelink resources available for transmitting the inter-UE coordination report. The starting sub-channel may be mapped to a single sidelink resource for transmitting the inter-UE coordination report, and additional sidelink resources available for inter-UE coordination reporting may be determined implicitly (e.g., by defining a fixed offset from the sidelink resource for transmitting the request for inter-UE coordination. A given sub-channel used for sending the request for inter-UE coordination may be mapped to a set of sidelink resources available for inter-UE coordination reporting.

As indicated above, FIG. 7 is provided as an example. Other examples may differ from what is described with respect to FIG. 7.

Figure 8:
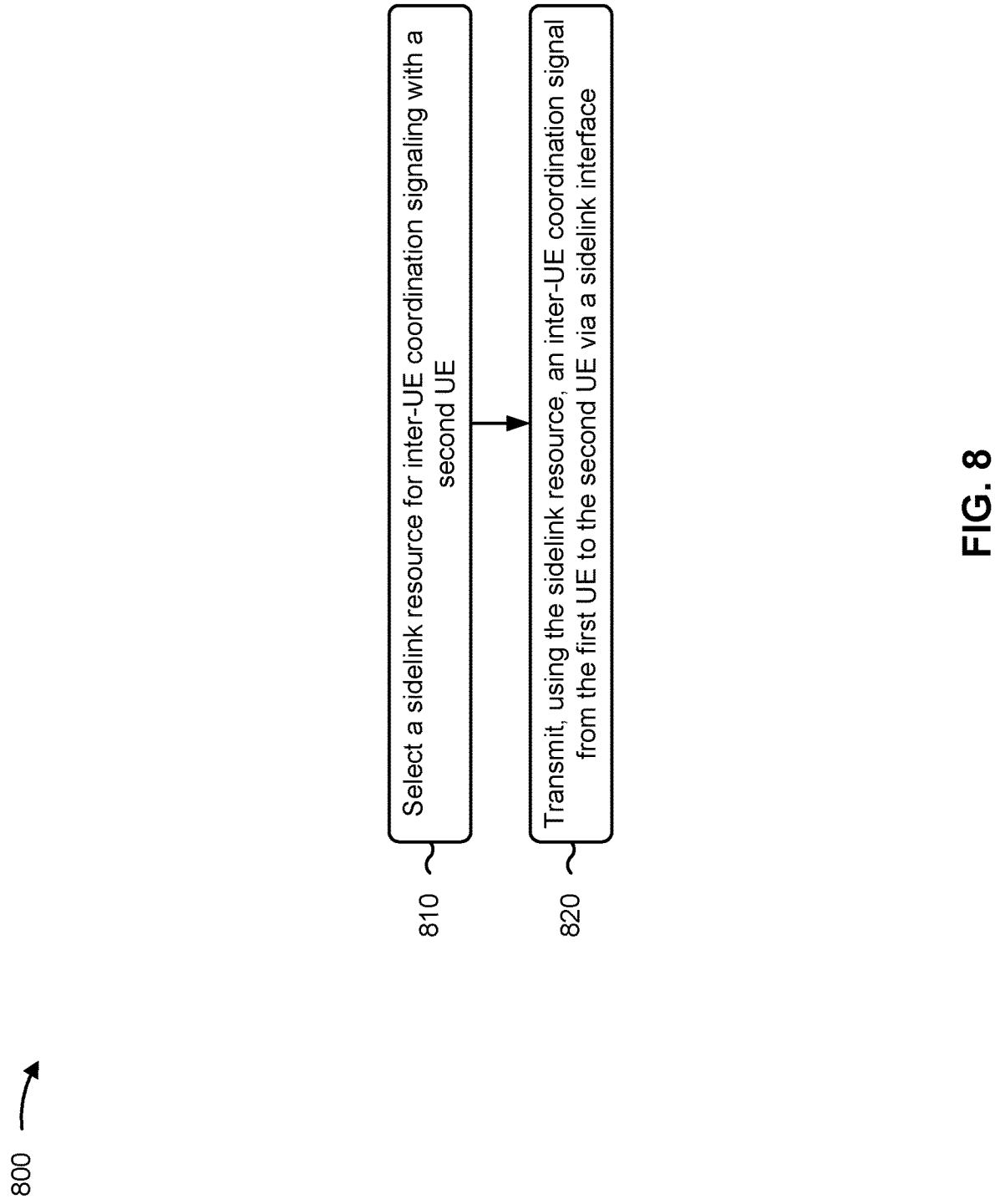
FIG. 8 is a diagram illustrating an example process associated with coordination signaling for sidelink resource selection, in accordance with the present disclosure.

FIG. 8 is a diagram illustrating an example process 800 performed, for example, by a first UE, in accordance with the present disclosure. Example process 800 is an example where the first UE (e.g., UE 120) performs operations associated with coordination signaling for sidelink resource selection.

As shown in FIG. 8, in some aspects, process 800 may include selecting a sidelink resource for inter-UE coordination signaling with a second UE (block 810). For example, the first UE (e.g., using antenna 252, demodulator 254, MIMO detector 256, receive processor 258, transmit processor 264, TX MIMO processor 266, modulator 254, controller/processor 280, and/or memory 282) may select a sidelink resource for inter-UE coordination signaling with a second UE, as described above.

As further shown in FIG. 8, in some aspects, process 800 may include transmitting, using the sidelink resource, an inter-UE coordination signal from the first UE to the second UE via a sidelink interface (block 820). For example, the first UE (e.g., using antenna 252, transmit processor 264, TX MIMO processor 266, modulator 254, controller/processor 280, and/or memory 282) may transmit, using the sidelink resource, an inter-UE coordination signal from the first UE to the second UE via a sidelink interface, as described above.

Process 800 may include additional aspects, such as any single aspect or any combination of aspects described below and/or in connection with one or more other processes described elsewhere herein.

In a first aspect, the inter-UE coordination signal is associated with a request for inter-UE coordination.

In a second aspect, alone or in combination with the first aspect, the inter-UE coordination signal is associated with an inter-UE coordination report.

In a third aspect, alone or in combination with one or more of the first and second aspects, selecting the sidelink resource for the inter-UE coordination signaling comprises selecting the sidelink resource from dedicated resources for inter-UE coordination signaling in a sidelink resource pool.

In a fourth aspect, alone or in combination with one or more of the first through third aspects, the dedicated resources are preconfigured per sidelink resource pool or per carrier.

In a fifth aspect, alone or in combination with one or more of the first through fourth aspects, selecting the sidelink resource for the inter-UE coordination signaling comprises selecting the sidelink resource from resources in a sidelink resource pool dedicated for inter-UE coordination signaling.

In a sixth aspect, alone or in combination with one or more of the first through fifth aspects, the sidelink resource is associated with one or more sub-channels.

In a seventh aspect, alone or in combination with one or more of the first through sixth aspects, the sidelink resource is included in a plurality of sidelink resources available for the inter-UE coordination signaling, and the plurality of sidelink resources are configured with a defined periodicity.

In an eighth aspect, alone or in combination with one or more of the first through seventh aspects, the plurality of sidelink resources available for the inter-UE coordination signaling are configured in a single sidelink slot or distributed across a plurality of sidelink slots.

In a ninth aspect, alone or in combination with one or more of the first through eighth aspects, the plurality of sidelink resources available for the inter-UE coordination signaling are configured in a frequency domain and in a time domain to reduce latency.

In a tenth aspect, alone or in combination with one or more of the first through ninth aspects, process 800 includes transmitting signaling to a plurality of UEs including the second UE indicating that the plurality of sidelink resources are not available for data transmissions.

In an eleventh aspect, alone or in combination with one or more of the first through tenth aspects, process 800 includes receiving a sidelink resource configuration that defines a set of sidelink resources, wherein selecting the sidelink resource for the inter-UE coordination signaling comprises selecting the sidelink resource based at least in part on the sidelink resource configuration.

In a twelfth aspect, alone or in combination with one or more of the first through eleventh aspects, receiving the sidelink resource configuration comprises receiving the sidelink resource configuration from a base station or a relay node.

In a thirteenth aspect, alone or in combination with one or more of the first through twelfth aspects, selecting the sidelink resource for the inter-UE coordination signaling comprises selecting the sidelink resource based at least in part on a sidelink resource allocation in which the UE senses a sidelink resource that is available and reserves the sidelink resource.

In a fourteenth aspect, alone or in combination with one or more of the first through thirteenth aspects, selecting the sidelink resource based at least in part on the sidelink resource allocation comprises sensing the sidelink resource that is available from a sidelink resource pool dedicated for inter-UE coordination signaling.

In a fifteenth aspect, alone or in combination with one or more of the first through fourteenth aspects, the inter-UE coordination signal is a first inter-UE coordination signal and the sidelink resource is a first sidelink resource, and process 800 further comprises receiving, using a second sidelink resource, a second inter-UE coordination signal from the second UE via the sidelink interface.

In a sixteenth aspect, alone or in combination with one or more of the first through fifteenth aspects, the first inter-UE coordination signal is associated with a request for inter-UE coordination and the second inter-UE coordination signal is associated with an inter-UE coordination report transmitted based at least in part on the request for inter-UE coordination.

In a seventeenth aspect, alone or in combination with one or more of the first through sixteenth aspects, process 800 includes mapping the second sidelink resource to the first sidelink resource.

In an eighteenth aspect, alone or in combination with one or more of the first through seventeenth aspects, process 800 includes determining the second sidelink resource based at least in part on mapping a starting sub-channel associated with the first sidelink resource to the second sidelink resource.

In a nineteenth aspect, alone or in combination with one or more of the first through eighteenth aspects, process 800 includes determining additional sidelink resources for inter-UE coordination signaling based at least in part on a fixed offset from the second sidelink resource.

In a twentieth aspect, alone or in combination with one or more of the first through nineteenth aspects, process 800 includes mapping a sub-channel associated with the first sidelink resource to a set of sidelink resources useable for inter-UE coordination signaling.

In a twenty-first aspect, alone or in combination with one or more of the first through twentieth aspects, the first sidelink resource and the second sidelink resource are included in a same defined period.

In a twenty-second aspect, alone or in combination with one or more of the first through twenty-first aspects, the first sidelink resource is included in a first plurality of sidelink resources and the second sidelink resource is included in a second plurality of sidelink resources, and the second plurality of sidelink resources is a multiple of the first plurality of sidelink resources.

In a twenty-third aspect, alone or in combination with one or more of the first through twenty-second aspects, process 800 includes mapping the second sidelink resource to the first sidelink resource based at least in part on an index assigned to the first sidelink resource.

In a twenty-fourth aspect, alone or in combination with one or more of the first through twenty-third aspects, process 800 includes mapping the first sidelink resource to a plurality of sidelink resources, wherein at least a portion of the plurality of sidelink resources are available for transmitting the second inter-UE coordination signal.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a first user equipment (UE), comprising: selecting a sidelink resource for inter-UE coordination signaling with a second UE; and transmitting, using the sidelink resource, an inter-UE coordination signal from the first UE to the second UE via a sidelink interface.

Aspect 2: The method of Aspect 1, wherein the inter-UE coordination signal is associated with a request for inter-UE coordination.

Aspect 3: The method of any of Aspects 1-2, wherein the inter-UE coordination signal is associated with an inter-UE coordination report.

Aspect 4: The method of any of Aspects 1-3, wherein selecting the sidelink resource for the inter-UE coordination signaling comprises: selecting the sidelink resource from dedicated resources for inter-UE coordination signaling in a sidelink resource pool.

Aspect 5: The method of Aspect 4, wherein the dedicated resources are configured or preconfigured per sidelink resource pool, per carrier, or per bandwidth part.

Aspect 6: The method of any of Aspects 1-5, wherein selecting the sidelink resource for the inter-UE coordination signaling comprises: selecting the sidelink resource from resources in a sidelink resource pool dedicated for inter-UE coordination signaling.

Aspect 7: The method of any of Aspects 1-6, wherein the sidelink resource is associated with one or more resource blocks or sub-channels.

Aspect 8: The method of any of Aspects 1-7, wherein the sidelink resource is included in a plurality of sidelink resources available for the inter-UE coordination signaling, and wherein the plurality of sidelink resources are configured with a defined periodicity.

Aspect 9: The method of Aspect 8, wherein the plurality of sidelink resources available for the inter-UE coordination signaling are configured in a single sidelink slot or distributed across a plurality of sidelink slots.

Aspect 10: The method of Aspect 8, wherein the plurality of sidelink resources available for the inter-UE coordination signaling are configured in a frequency domain and in a time domain.

Aspect 11: The method of Aspect 8, further comprising: transmitting signaling to a plurality of UEs including the second UE indicating that the plurality of sidelink resources are not available for data transmissions.

Aspect 12: The method of any of Aspects 1-11, further comprising: receiving a sidelink resource configuration that defines a set of sidelink resources, wherein selecting the sidelink resource for the inter-UE coordination signaling comprises: selecting the sidelink resource based at least in part on the sidelink resource configuration. wherein selecting the sidelink resource for the inter-UE coordination signaling comprises: selecting the sidelink resource based at least in part on the sidelink resource configuration.

Aspect 13: The method of Aspect 12, wherein receiving the sidelink resource configuration comprises: receiving the sidelink resource configuration from a base station or a relay node.

Aspect 14: The method of any of Aspects 1-13, wherein selecting the sidelink resource for the inter-UE coordination signaling comprises: selecting the sidelink resource based at least in part on a sidelink resource allocation in which the UE senses a sidelink resource that is available and reserves the sidelink resource.

Aspect 15: The method of Aspect 14, wherein selecting the sidelink resource based at least in part on the sidelink resource allocation comprises: sensing the sidelink resource that is available from a sidelink resource pool dedicated for inter-UE coordination signaling; or reserving the sidelink resource that is available from the sidelink resource pool dedicated for inter-UE coordination signaling.

Aspect 16: The method of any of Aspects 1-15, wherein the inter-UE coordination signal is a first inter-UE coordination signal and the sidelink resource is a first sidelink resource, and wherein the method further comprises: receiving, using a second sidelink resource, a second inter-UE coordination signal from the second UE via the sidelink interface.

Aspect 17: The method of Aspect 16, wherein the first inter-UE coordination signal is associated with a request for inter-UE coordination and the second inter-UE coordination signal is associated with an inter-UE coordination report transmitted based at least in part on the request for inter-UE coordination.

Aspect 18: The method of Aspect 16, further comprising: mapping the first sidelink resource to the second sidelink resource.

Aspect 19: The method of Aspect 16, further comprising: mapping a sub-channel associated with the first sidelink resource to a set of sidelink resources useable for inter-UE coordination signaling.

Aspect 20: The method of Aspect 16, wherein the first sidelink resource and the second sidelink resource are included in a same defined period.

Aspect 21: The method of Aspect 16, wherein the first sidelink resource is included in a first plurality of sidelink resources and the second sidelink resource is included in a second plurality of sidelink resources, and wherein the second plurality of sidelink resources is a multiple of the first plurality of sidelink resources.

Aspect 22: The method of Aspect 16, further comprising: mapping the first sidelink resource to the second sidelink resource based at least in part on an index assigned to the first sidelink resource.

Aspect 23: The method of Aspect 16, further comprising: mapping the first sidelink resource to a plurality of sidelink resources, wherein at least a portion of the plurality of sidelink resources are available for transmitting the second inter-UE coordination signal.

Aspect 24: The method of Aspect 16, further comprising: determining the second sidelink resource based at least in part on mapping a starting sub-channel associated with the first sidelink resource to the second sidelink resource.

Aspect 25: The method of Aspect 24, further comprising: determining additional sidelink resources for inter-UE coordination signaling based at least in part on a fixed offset from the second sidelink resource.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
   one or more memories; and
   one or more processors, coupled to the one or more memories, configured to:
      receive, using a first sidelink resource, a request for inter-UE coordination; and
      transmit, using a second sidelink resource, an inter-UE coordination report to a second UE via a sidelink interface, the second sidelink resource selected by the first UE based at least in part on a mapping between the first sidelink resource and the second sidelink resource.

2. The apparatus of claim 1, wherein the one or more processors are configured to:
   select the second sidelink resource from dedicated resources for inter-UE coordination signaling in a sidelink resource pool.

3. The apparatus of claim 2, wherein the dedicated resources are configured or preconfigured per sidelink resource pool, per carrier, or per bandwidth part.

4. The apparatus of claim 1, wherein the one or more processors are configured to:
   select the second sidelink resource from resources in a sidelink resource pool dedicated for inter-UE coordination signaling.

5. The apparatus of claim 1, wherein the second sidelink resource is associated with one or more resource blocks or sub-channels.

6. The apparatus of claim 1, wherein the first sidelink resource is included in a plurality of sidelink resources available for inter-UE coordination signaling, and wherein the plurality of sidelink resources are configured with a defined periodicity.

7. The apparatus of claim 6, wherein the plurality of sidelink resources available for the inter-UE coordination signaling are configured in a single sidelink slot or distributed across a plurality of sidelink slots.

8. The apparatus of claim 6, wherein the plurality of sidelink resources available for the inter-UE coordination signaling are configured in a frequency domain and in a time domain.

9. The apparatus of claim 6, wherein the one or more processors are further configured to:
   transmit signaling to a plurality of UEs including the second UE indicating that the plurality of sidelink resources are not available for data transmissions.

10. The apparatus of claim 1, wherein the one or more processors are further configured to:
    receive a sidelink resource configuration that defines a set of sidelink resources,
    wherein the one or more processors are configured to:
       select the second sidelink resource based at least in part on the sidelink resource configuration.

11. The apparatus of claim 10, wherein the one or more processors, to receive the sidelink resource configuration, are configured to:
    receive the sidelink resource configuration from a network entity or another UE.

12. The apparatus of claim 1, wherein the one or more processors are configured to:
    select the second sidelink resource based at least in part on a sidelink resource allocation in which the first UE senses the second sidelink resource as available and reserves the second sidelink resource.

13. The apparatus of claim 12, wherein the one or more processors are configured to:
- sense the second sidelink resource as available from a sidelink resource pool dedicated for inter-UE coordination signaling; or
- reserve the second sidelink resource from the sidelink resource pool dedicated for inter-UE coordination signaling.

14. The apparatus of claim 1, wherein the inter-UE coordination report is transmitted based at least in part on the request for inter-UE coordination.

15. The apparatus of claim 1, wherein the one or more processors are further configured to:
- map the first sidelink resource to the second sidelink resource.

16. The apparatus of claim 1, wherein the one or more processors are further configured to:
- map a sub-channel associated with the first sidelink resource to a set of sidelink resources useable for inter-UE coordination signaling.

17. The apparatus of claim 1, wherein the first sidelink resource and the second sidelink resource are included in a same defined period.

18. The apparatus of claim 1, wherein the first sidelink resource is included in a first plurality of sidelink resources and the second sidelink resource is included in a second plurality of sidelink resources, and wherein the second plurality of sidelink resources is a multiple of the first plurality of sidelink resources.

19. The apparatus of claim 1, wherein the one or more processors are further configured to:
- map the first sidelink resource to the second sidelink resource based at least in part on an index assigned to the first sidelink resource.

20. The apparatus of claim 1, wherein the one or more processors are further configured to:
- map the first sidelink resource to a plurality of sidelink resources, wherein at least a portion of the plurality of sidelink resources are available for transmitting the inter-UE coordination report.

21. The apparatus of claim 1, wherein the one or more processors are further configured to:
- determine the second sidelink resource based at least in part on mapping a starting sub-channel associated with the first sidelink resource to the second sidelink resource.

22. The apparatus of claim 21, wherein the one or more processors are further configured to:
- determine additional sidelink resources for inter-UE coordination signaling based at least in part on a fixed offset from the second sidelink resource.

23. A method of wireless communication performed by a first user equipment (UE), comprising:
- receiving, using a first sidelink resource, a request for inter-UE coordination; and
- transmitting, using a second sidelink resource, an inter-UE coordination report to a second UE via a sidelink interface, the second sidelink resource selected by the first UE based at least in part on a mapping between the first sidelink resource and the second sidelink resource.

24. The method of claim 23, further comprising:
- mapping the first sidelink resource to the second sidelink resource.

25. The method of claim 23, further comprising:
- mapping the first sidelink resource to a plurality of sidelink resources, wherein at least a portion of the plurality of sidelink resources are available for transmitting the inter-UE coordination report.

26. A non-transitory computer-readable medium storing a set of instructions for wireless communication, the set of instructions comprising:
- one or more instructions that, when executed by one or more processors of a first user equipment (UE), cause the first UE to:
  - receive, using a first sidelink resource, a request for inter-UE coordination; and
  - transmit, using a second sidelink resource, an inter-UE coordination report to a second UE via a sidelink interface, the second sidelink resource selected by the first UE based at least in part on a mapping between the first sidelink resource and the second sidelink resource.

27. The non-transitory computer-readable medium of claim 26, wherein the one or more processors are further configured to:
- map the first sidelink resource to the second sidelink resource.

28. The non-transitory computer-readable medium of claim 26, wherein the one or more processors are further configured to:
- map the first sidelink resource to a plurality of sidelink resources, wherein at least a portion of the plurality of sidelink resources are available for transmitting the inter-UE coordination report.

29. An apparatus for wireless communication, comprising:
- means for receiving, using a first sidelink resource, a request for inter-user equipment (UE) coordination; and
- means for transmitting, using a second sidelink resource, an inter-UE coordination report to a UE via a sidelink interface, the second sidelink resource selected by the apparatus based at least in part on a mapping between the first sidelink resource and the second sidelink resource.

30. The apparatus of claim 29, further comprising:
- means for mapping the first sidelink resource to the second sidelink resource.

* * * * *